(12) United States Patent
Tahenakos et al.

(10) Patent No.: US 11,363,019 B2
(45) Date of Patent: Jun. 14, 2022

(54) DOMAIN JOIN

(71) Applicant: Hewlett-Packard Development Company, L.P., Spring, TX (US)

(72) Inventors: Zachary Tahenakos, Fort Collins, CO (US); Daniel Bungert, Fort Collins, CO (US); Timothy J. Freese, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 92 days.

(21) Appl. No.: 16/646,210

(22) PCT Filed: Oct. 9, 2017

(86) PCT No.: PCT/US2017/055742
§ 371 (c)(1),
(2) Date: Mar. 11, 2020

(87) PCT Pub. No.: WO2019/074474
PCT Pub. Date: Apr. 18, 2019

(65) Prior Publication Data
US 2020/0274869 A1      Aug. 27, 2020

(51) Int. Cl.
*G06F 9/4401* (2018.01)
*H04L 41/0813* (2022.01)
*H04L 41/12* (2022.01)
*H04L 9/40* (2022.01)

(52) U.S. Cl.
CPC ........ *H04L 63/0876* (2013.01); *G06F 9/4416* (2013.01); *H04L 41/0813* (2013.01); *H04L 41/12* (2013.01); *H04L 63/104* (2013.01)

(58) Field of Classification Search
CPC ... H04L 63/083; H04L 63/0823; H04L 63/10; H04L 63/0876; H04L 63/062; H04L 63/102; H04L 67/22; H04L 63/04; H04L 67/32; H04L 9/0833; G06F 21/445;
(Continued)

(56) References Cited

U.S. PATENT DOCUMENTS

| 8,370,905 B2 | 2/2013 | Sangubhatla |
| 8,856,506 B2 | 10/2014 | Weber et al. |
| 9,565,190 B1 | 2/2017 | Telvik et al. |

(Continued)

OTHER PUBLICATIONS

Offline Domain Join (Djoin.exe) Step-by-step Guide, May 19, 2014, https://technet.microsoft.com/en-us/library/offline-domain-join-djoin-step-by-step(v=ws.10).aspx.
(Continued)

*Primary Examiner* — Tonia L Dollinger
*Assistant Examiner* — Linh T. Nguyen
(74) *Attorney, Agent, or Firm* — Brooks Cameron & Huebsch PLLC

(57) ABSTRACT

Example implementations relate to a domain join. An example controller can remotely configure and authenticate a computing device within a computing network to join a domain. In response to the configuration and authentication, the controller can record to the computing device that the domain join has been requested but not fulfilled. The computing device can be joined to the domain based on the domain join request record and in response to a restart of the computing device and receipt of domain credentials at the computing device.

13 Claims, 3 Drawing Sheets

(58) Field of Classification Search
CPC .......... G06F 3/1204; G06F 2212/1016; G06F 21/62; G06F 7/38; G06F 3/0611
See application file for complete search history.

(56) References Cited

U.S. PATENT DOCUMENTS

| | | | |
|---|---|---|---|
| 2006/0085648 A1* | 4/2006 | Cheston | H04L 63/083 713/182 |
| 2006/0168444 A1* | 7/2006 | Miller | H04L 9/006 713/158 |
| 2008/0209207 A1* | 8/2008 | Parupudi | H04L 63/0823 713/156 |
| 2008/0243649 A1* | 10/2008 | Arakawa | G06Q 10/00 705/28 |
| 2008/0263217 A1* | 10/2008 | Kimizuka | H04L 67/2814 709/229 |
| 2009/0037559 A1 | 2/2009 | Ran | |
| 2009/0313321 A1 | 12/2009 | Parsons et al. | |
| 2010/0313248 A1* | 12/2010 | Krivosheev | H04L 9/3226 726/5 |
| 2011/0107401 A1* | 5/2011 | Bhai | G06F 21/445 726/4 |
| 2011/0283104 A1 | 11/2011 | Sangubhatla | |
| 2015/0046984 A1 | 2/2015 | Belton et al. | |
| 2015/0350912 A1* | 12/2015 | Head | H04L 61/2007 726/4 |
| 2017/0272953 A1* | 9/2017 | Nathan | H04W 12/08 |
| 2017/0366411 A1* | 12/2017 | Jiang | H04L 61/20 |
| 2018/0145960 A1* | 5/2018 | Bakshan | H04L 29/66 |

OTHER PUBLICATIONS

Support for Standard Driver Features, 2014, https://www.netiq.com/documentation/idm45drivers/multidomain_ad/data/b8rffe7.html.
What Are the New Features in Windows 2012 Active Directory, 2012, http://activedirectoryfaq.blogspot.in/2012/08/what-are-new-features-in-windows-2012.html.

* cited by examiner

DOMAIN JOIN

BACKGROUND

A domain can be a group of computing devices on a network administered under a same protocol. A domain join can include a user securely connecting to ("joining") a domain using network credentials.

DETAILED DESCRIPTION

Figure 1:
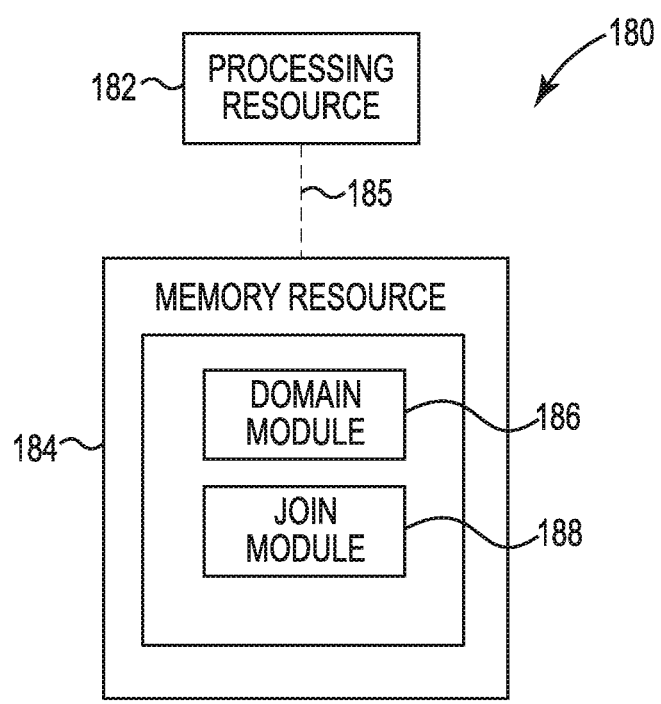
FIG. 1 illustrates a diagram of a computing system including a processing resource, a memory resource, and a number of modules according to an example.

To join a computing device to a domain, a user can be logged on to the computing device with a local administrator account or, if the user is logged on to the computer with a user account that does not have local computer administrative credentials, credentials for the local administrator account can be provided during the process of joining the computing device to the domain. In addition, to join the computing device to the domain, a user may need an account in the domain. During the process of joining the computing device to the domain, a user may be prompted for user domain account credentials such as a user name and password.

For example, in order to join a computing device to a domain such as an Active Directory Domain Services domain, credentials for a valid user within the domain may be provided during the join process, and once the join has completed, the user can log out of the computing device and log back into the computing device as a domain user. The domain is not limited to an Active Directory Domain Service, such that the domain may be non-Windows-based, and/or a domain join can include different groupings of computing devices that demand credentials prior to joining the domain.

In some approaches to a domain join, a user may be physically at a computing device that is joining a domain in order to facilitate the join. This can prevent a computing device from being able to join the domain without user intervention. Depending on capabilities of an associated remote management system, the associated remote management system may or may not be able to handle the join autonomously. For example, if the remote management system is capable of delivering remote commands and/or mutating settings, a join may be possible, but since credentials are involved, those credentials may be transferred, stored, used, and deleted. Having to transfer, store, use, and then delete credentials may pose a security risk that may be undesirable for some computing device or network users and/or administrators.

Examples of the present disclosure can take advantage of credentials being provided in order to log into a computing device once the computing device is joined to the domain. For instance, because the same credentials may be used to log into the domain and join the domain, both the log in and the domain join can be done at the same time. In some examples, a computing device can be instructed to join the domain without a user (e.g., an end user) having to facilitate it until the entire computing device is ready to be used. This can result in increased benefits as a system deployment size increases. For instance, for a deployment of ten computing devices, it may not take a long time for an administrator to go to each computing device and manually join it to the domain. However, for a system deployment of 100 computing devices, the process may be substantially slower, and can slow as more and more computing devices are in the deployment and marked to configure. Examples of the present disclosure can instruct the computing device to join the domain at a later time (e.g., when a user logs in to the computing device), which can allow for more efficient delegation of the process, as a user of the computing device can have the computing device join the domain when they log in.

Similarly, examples of the present disclosure can configure computing devices using remote management without special processes. For instance, for a computing device that is not domain joined, examples can allow for configuring the computing device via remote management without user intervention. A system administrator can configure desired settings and deploy the settings to the computing devices. In other approaches, in order to join a computing device (or computing devices) to a domain, not only are the settings configured and deployed, but each computing device is manually joined. Examples of the present disclosure allow for the domain join to occur as part of the setting configuration since it becomes a setting in the present disclosure. Additional processes to join the domain, such as manually joining it or storing and transporting credentials for the domain join may be avoided in some examples of the present disclosure.

FIG. 1 illustrates a diagram of a computing system 180 including a processing resource 182, a memory resource 184, and a number of modules 186, 188 according to an example. The computing system 180 can utilize instructions (e.g., software and/or firmware) hardware, and/or logic to perform a number of functions including those described herein. The computing system 180 can be a combination of hardware and program instructions configured to share information. The hardware, for example, can include a processing resource 182 and/or a memory resource 184 (e.g., computer readable medium (CRM), machine readable medium (MRM), etc., database, etc.).

A processing resource 182, as used herein, can include a processor capable of executing instructions stored by a memory resource 184. Processing resource 182 can be implemented in a single device or distributed across multiple devices. The program instructions (e.g., machine-readable instructions (MRI)) can include instructions stored on the memory resource 184 and executable by the processing resource 182 to implement a desired function (e.g., joining a domain).

The memory resource 184 can be in communication with a processing resource 182. A memory resource 184, as used herein, can include memory components capable of storing instructions that can be executed by processing resource 182. Such memory resource 184 can be a non-transitory CRM or MRM. Memory resource 184 can be integrated in a single device or distributed across multiple devices. Further, memory resource 184 can be fully or partially integrated in the same device as processing resource 182 or it can be separate but accessible to that device and processing resource 182. Thus, it is noted that the computing system 180 can be implemented on a participant device, on a server device, on a collection of server devices, and/or a combination of the user device and the server device.

The memory resource 184 can be in communication with the processing resource 182 via a communication link (e.g., a path) 185. The communication link 185 can be local or remote to a machine (e.g., a computing system) associated with the processing resource 182. Examples of a local communication link 185 can include an electronic bus internal to a machine (e.g., a computing system) where the memory resource 184 is one of volatile, non-volatile, fixed, and/or removable storage medium in communication with the processing resource 182 via the electronic bus.

A module and/or modules 186, 188 can include MRI that when executed by the processing resource 182 can perform a number of functions including those described herein. The number of modules 186, 188 can be sub-modules of other modules. For example, the determination module 186 and the overlay module 188 can be sub-modules and/or contained within the same computing system. In another example, the number of modules 186, 188 can comprise individual modules at separate and distinct locations (e.g., MRM, etc.).

Each of the number of modules 186, 188 can include instructions that when executed by the processing resource 182 can function as a corresponding engine. For example, the overlay module 188 can include instructions that when executed by the processing resource 182 can function as an overlay engine, such as overlay engine 236 illustrated in FIG. 2.

In some examples, engines can be part of a system (not illustrated in FIG. 1) including a database, a subsystem, and the number of engines. The subsystem can include the number of engines in communication with the database via a communication link (e.g., link 285 as referenced in FIG. 2). The system can represent instructions and/or hardware of a network controller (e.g., controller 230 as referenced in FIG. 2, etc.).

The number of engines can include a combination of hardware and programming to perform functions including those described herein. The instructions can include instructions (e.g., software, firmware, etc.) stored in a memory resource (e.g., CRM, MRM, etc.) as well as hard-wired program (e.g., logic).

In some examples, the number of modules 186, 188 can be used in a software-as-a-service delivery model. For instance, components of computing system 180 can exist in a single computing system or multiple computing systems (e.g., distributed). For example, a web server or other computing system that is trusted by the user can provide services to a server of individual data streams, and/or act on behalf of the user as a processing agent for recovery.

Some examples of the present disclosure can take advantage of credentials being provided in order to log into a computing device once it has been joined to a domain. Because the same credentials used to log into the domain can be used for joining the computing device to the domain, log in and domain join can be done at the same time.

For instance, domain module 186 can include instructions that when executed by the processing resource 182 can cause a computing system to remotely configure and authenticate a plurality of computing devices within a computing network to join a domain. Example domains can include, for instance, an Active Directory Domain Services domain, Univention Corporate Server domain, Apache Directory domain, or an Open LDAP domain, among others. On a computing device that is not joined to the domain, a user can configure the system to join and authenticate against the domain. This can include manual configuration of the computing device using a configuration utility or via remote management.

In such an example, instead of prompting for credentials, the computing device can record a current state such that a domain join has been requested, but has not yet been fulfilled. When the computing device has been restarted (e.g., logged out of its currently logged in user) either via a log out process or a system reboot, the computing device can request a user to log in with their domain credentials. When credentials are provided, the computing device can determine if a domain join has been requested.

For example, system 180 can include instructions executable to determine if a request has been made for the computing device to join the domain in response to receipt of the domain credentials. In response to a determination that the request has not been made, the instructions can be executable to determine that the request was previously fulfilled. In response to a determination that the request has been made, the instructions can be executable to join the computing device to the domain based on the remote configuration and authentication.

For instance, join module 188 can include instructions that when executed by the processing resource 182 can cause a computing system to join the computing device to the domain based on the remote configuration and authentication. As noted, in some examples, the join can be in response to receipt of domain credentials requested at one of the plurality of computing devices.

If a domain join has been requested but not fulfilled, the domain join can be processed with the provided credentials. If the join was successful, the domain join request can be marked as completed. If no domain join has been requested, an assumption can be made that a domain join request was already fulfilled, and the computing device can proceed with the domain join login.

Figure 2:
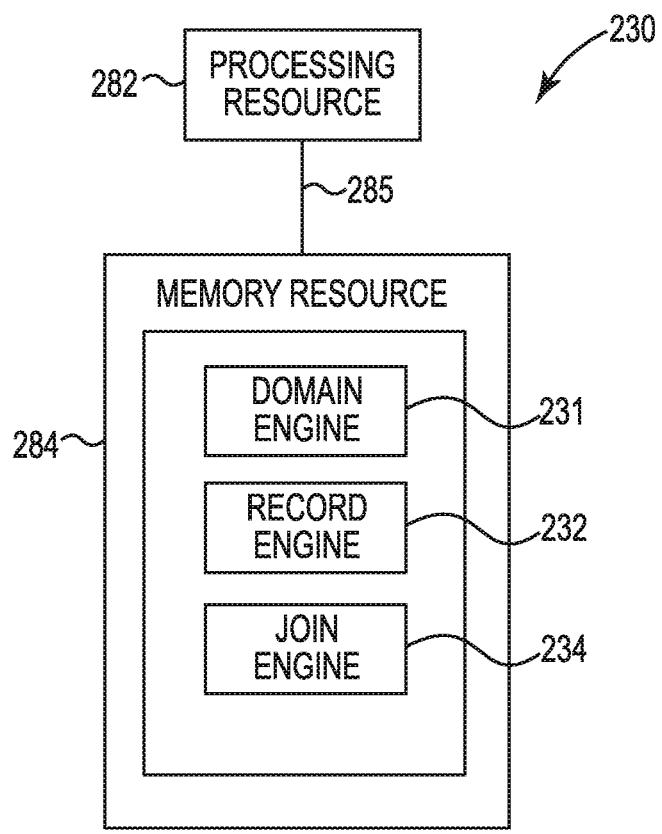
FIG. 2 illustrates a diagram of a controller including a processing resource, a memory resource, and an engine according to an example.

FIG. 2 illustrates a diagram of an example controller 230 including a processing resource 282, a memory resource 284, and a plurality of engines 231, 232, 234 according to an example. For example, the controller 230 can be a combination of hardware and instructions for joining a domain. The hardware, for example can include a processing resource 282 and/or a memory resource 284 (e.g., MRM, CRM, data store, etc.).

The processing resource 282, as used herein, can include a number of processors capable of executing instructions stored by a memory resource 284. The instructions (e.g., MRI) can include instructions stored on the memory resource 284 and executable by the processing resource 282 to implement a desired function (e.g., joining a domain). The memory resource 284, as used herein, can include a number of memory components capable of storing non-transitory instructions that can be executed by processing resource 282. Memory resource 284 can be integrated in a single device or distributed across multiple devices. Further, memory resource 284 can be fully or partially integrated in the same device as processing resource 282 or it can be separate but accessible to that device and processing resource 282. Thus, it is noted that the controller 230 can be implemented on an electronic device and/or a collection of electronic devices, among other possibilities.

The memory resource 284 can be in communication with the processing resource 282 via a communication link (e.g., path) 285. The communication link 285 can be local or remote to an electronic device associated with the processing resource 282. The memory resource 284 includes engines (e.g., domain engine 231, record engine 232, join engine 234). The memory resource 284 can include more engines than illustrated to perform the various functions described herein.

The engines 231, 232, 234 can include a combination of hardware and instructions to perform a number of functions described herein (e.g., joining a domain). The instructions (e.g., software, firmware, etc.) can be downloaded and stored in a memory resource (e.g., MRM) as well as a hard-wired program (e.g., logic), among other possibilities.

The domain engine 231 can remotely configure and authenticate a computing device within a computing network to join a domain. In some examples, the computing device can be a thin client within a computing network; however examples of the present disclosure are not limited to thin clients. Other example computing device can include desktop computers or other devices within a network. A thin client can include a computing device connected to a server from a remote location. Thin clients can be components of a broader computing infrastructure, such as a network, where a plurality of thin clients shares computations with a server or server farm. Put another way, a thin client can be a network computing device without a hard disk drive acting as a terminal to the server. Example thin clients include a computing terminal at a public library or a computing terminal at an airport check-in area, among others.

Remotely configuring and authenticating the computing device can include remotely arranging or ordering elements of the computing device to fit it for a designated task and authenticating the computing device for a domain join upon log in by a credentialed user. For instance, a domain join can be requested, but not fulfilled, and the record engine 232 can record to the computing device that the domain join has been requested but not fulfilled in response to the configuration and authentication.

Remotely configuring and authenticating the computing device can include performing processes leading up to a domain join, but the performance can stop short of joining the computing device to the domain. Rather, a request to join the computing device to the domain is recorded or "flagged" in the computing device, but the actual join is delayed. While remote configuration and authentication is discussed herein, in some examples, the configuration and authentication can be performed manually, for instance, by an administrator physically present at a computing device requested to join the domain.

The join engine can join the computing device to the domain based on the domain join request record and in response to a restart of the computing device and receipt of domain credentials at the computing device. For instance, when a user logs in to the computing device with domain credentials, a determination can be made as to whether a request has been made to join the computing device to the domain. If a request has been made, the domain can be joined in response to the restart. The restart can include a log out and log on process of the computing device and/or a system reboot of the computing device, for instance. A prompt may be presented to a user via a user interface (e.g., display) to log off or reboot the computing device before the domain join.

Put another way, the controller can include instructions executable to request the domain credentials for access to the domain in response to the restart of the computing device and in response to the restart of the computing device and receipt of the domain credentials at the computing device, join the computing device to the domain. For instance, to join the domain, the computing device may undergo a log out and log on process, a system reboot, and/or receipt of domain join credentials.

Figure 3:
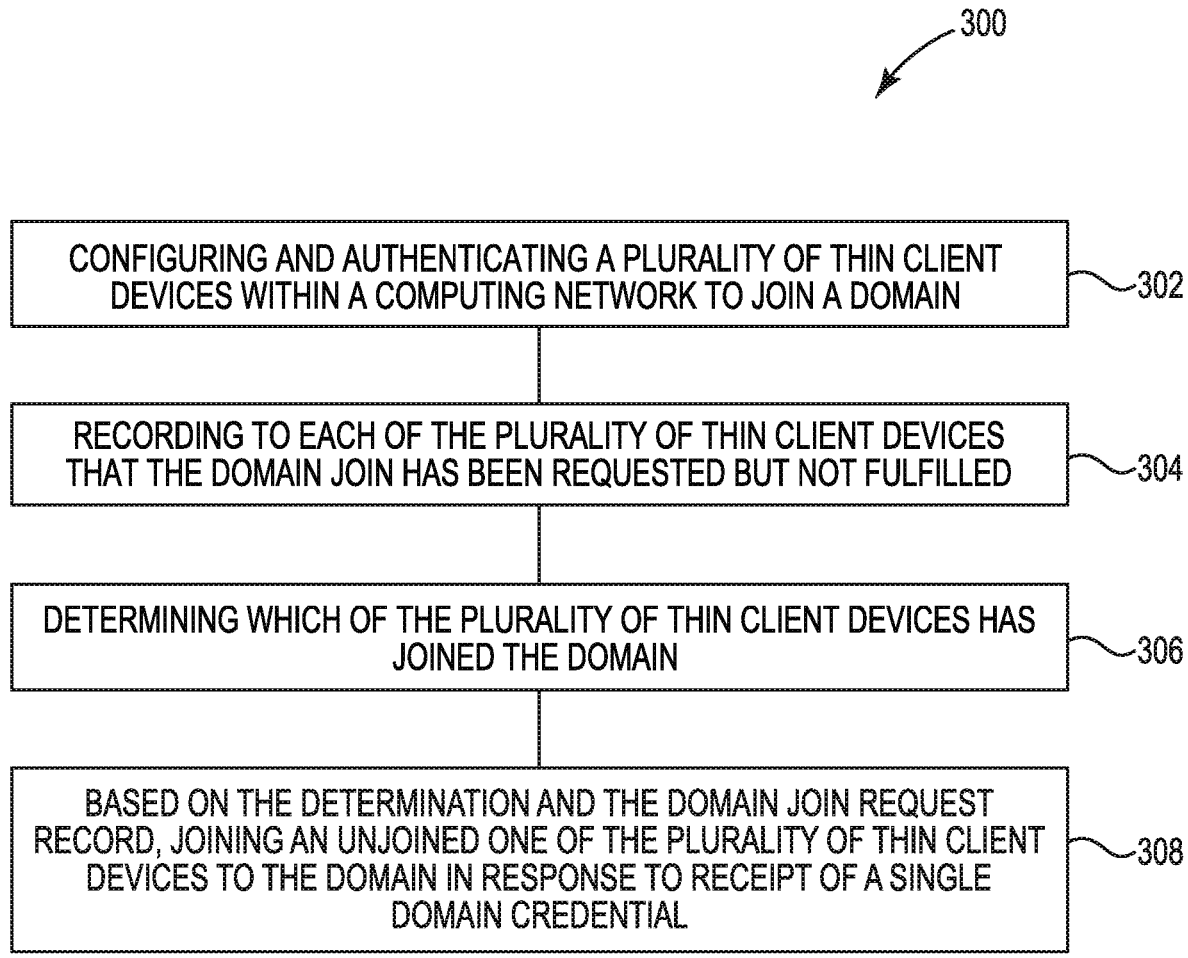
FIG. 3 illustrates a diagram of a method for joining a domain according to an example.

FIG. 3 illustrates a diagram of a method 300 for joining a domain according to an example. Method 300, which can be performed by a computing system 180 or a controller 230 as previously discussed herein, can allow for a delay in a demand for credentials until a user logs into a computing device requested to join a domain. In such an example, credential requests can be reduced from two (e.g., administrator and user) to one. Put another way, the user of the computing device completes a domain join started by an administrator when the user logs into the computing device with their credentials.

At 302, method 300 can include configuring and authenticating a plurality of thin client devices within a computing network to join a domain. For instance, a request can be made to join the plurality of thin clients to a domain. In some examples one, some, or all of the plurality of thin clients can be requested to join the domain. Examples of the present disclosure can allow for one, some, or all of the plurality of thin clients to be configured remotely such that configuration settings are deployed and authentication is provided to each of the thin clients requested to join the domain, which can reduce or eliminate an administrator from taking the time to go to each individual thin clients to manually configure and authenticate the thin client.

At 304, method 300 can include recording to each of the plurality of thin client devices that the domain join has been requested by not fulfilled. In response to the configuration and authentication, each thin client can be ready to join the domain upon log in using domain join credentials.

At 306, method 300 can include determining which of the plurality of thin client devices has joined the domain. For instance, if a thin client has already joined the domain, it may not need to be re-joined. However, if one of the plurality of thin clients is not joined to the domain, method 300, at 308, can include joining the unjoined one of the plurality of thin client device to the domain based on the determination and the domain join request record. For instance, based on the record on the one of the plurality of thin clients, a determination can be made that the thin client has an outstanding request to join the domain, and upon receipt of a single domain credential, the unjoined thin client can be joined to the domain. A single domain credential, as used herein, can include a credential received by one user, but may include multiple entries for the credential (e.g., username and password). For instance, a single domain credential can include a user entering their credentials, but not an administrator.

In the foregoing detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

What is claimed is:

1. A method, comprising:
    configuring and authenticating a plurality of thin client devices within a computing network to join a domain;
    determining if a request has been made for the computing device to join the domain in response to receipt of domain credentials at one of the plurality of thin clients;
    in response to a determination that the request has been made:
        recording to each of the plurality of thin client devices that the domain join has been requested but not fulfilled;
        determining which of the plurality of thin client devices has joined the domain; and
        based on the determination and the domain join request record, join an unjoined one of the plurality of thin client devices to the domain in response to receipt of a single domain credential; and
    in response to a determination that the request has not been made, determining that the request was previously fulfilled.

2. The method of claim 1, wherein recording that the domain join has been requested but not fulfilled further comprises delaying a domain credentials prompt at the unjoined one of the plurality of thin client devices until the restart of the one of the plurality of thin client devices.

3. The method of claim 1, further comprising configuring and authenticating the plurality of thin client devices to join the domain via remote management.

4. The method of claim 1, further comprising joining the unjoined one of the plurality of thin client devices to the domain in response to a restart of the computing device.

5. The method of claim 1, further comprising:
    joining the unjoined one of the plurality of thin client devices to the domain in response to receipt of a single domain credential at the unjoined one of the plurality of thin client devices based on the determination and the domain join request record; and
    joining a different unjoined one of the plurality of thin client devices to the domain in response to receipt of a single domain credential at the different unjoined one of the plurality of thin client devices based on the determination and the domain join request record.

6. The method of claim 1, further comprising automatically configuring and authenticating the plurality of thin client devices within the computing network to join the domain.

7. A controller comprising a processing resource in communication with a memory resource including instructions executable to:
    remotely configure and authenticate a computing device within a computing network to join a domain;
    determine if a request has been made for the computing device to join the domain in response to receipt of domain credentials at the computing device;
    in response to a determination that the request has been made:
        in response to the configuration and authentication, record to the computing device that the domain join has been requested but not fulfilled; and
        join the computing device to the domain based on the domain join request record and in response to a restart of the computing device and receipt of domain credentials at the computing device; and
    in response to a determination that the request has not been made, determine that the request was previously fulfilled.

8. The controller of claim 7, wherein the computing device is a thin client.

9. The controller of claim 7, wherein the restart is a log out and log on process of the computing device.

10. The controller of claim 7, wherein the restart is system reboot of the computing device.

11. The controller of claim 7, wherein the instructions are further executable to:
    request the domain credentials for access to the domain in response to the restart of the computing device; and
    in response to the restart of the computing device and receipt of the domain credentials at the computing device, join the computing device to the domain.

12. A non-transitory machine-readable medium storing instructions executable by a processing resource to cause a computing system to:
    remotely configure and authenticate a plurality of computing devices within a computing network to join a domain;
    in response to receipt of domain credentials at one of the plurality of computing devices, determine if a request has been made for the computing device to join the domain; and
    join the computing device to the domain based on the remote configuration and authentication in response to a determination that the request has been made; and
    determine that the request was previously fulfilled in response to a determination that the request has not been made.

13. The medium of claim 12, wherein the domain is an Active Directory Domain Services domain.

* * * * *